US012315690B2

(12) United States Patent
Marlin et al.

(10) Patent No.: US 12,315,690 B2
(45) Date of Patent: May 27, 2025

(54) DEVICE WITH SEALED INNER CHAMBER

(71) Applicant: ARIANEGROUP SAS, Les Mureaux (FR)

(72) Inventors: Frédéric Marlin, Le Haillan (FR); Romain Lorenzon, Le Haillan (FR)

(73) Assignee: ARIANEGROUP SAS, Les Mureaux (FR)

(*) Notice: Subject to any disclaimer, the term of this patent is extended or adjusted under 35 U.S.C. 154(b) by 138 days.

(21) Appl. No.: 18/006,827

(22) PCT Filed: Jul. 23, 2021

(86) PCT No.: PCT/FR2021/051382
§ 371 (c)(1),
(2) Date: Jan. 25, 2023

(87) PCT Pub. No.: WO2022/023655
PCT Pub. Date: Feb. 3, 2022

(65) Prior Publication Data

US 2023/0274899 A1 Aug. 31, 2023

(30) Foreign Application Priority Data

Jul. 28, 2020 (FR) ...................................... 2007969

(51) Int. Cl.
*H01H 39/00* (2006.01)
*H01H 1/66* (2006.01)
*H01H 9/04* (2006.01)
*H01H 9/30* (2006.01)

(52) U.S. Cl.
CPC ............ *H01H 39/006* (2013.01); *H01H 1/66* (2013.01); *H01H 9/04* (2013.01); *H01H 9/30* (2013.01)

(58) Field of Classification Search
CPC ...... B61R 2021/01; B61R 2021/01034; B61R 21/00; B61R 21/16; B61R 21/264; B61R 21/2644; H01H 2003/00; H01H 2003/02; H01H 2003/022; H01H 2003/0233; H01H 2003/026; H01H 2003/0273; H01H 2009/04; H01H 2009/048; H01H 2201/01; H01H 2223/00; H01H 2223/002; H01H 2223/006; H01H 2231/026; H01H 85/00; H01H 39/00; H01H 39/006; H01H 1/66; H01H 9/00; H01H 9/004; H01H 9/04; H01H 9/042; H01H 9/30; H01H 3/00; H01H 3/02; H01H 9/02; H01H 9/0264; H01H 9/043; H01H 9/045; H01H 13/50; B60L 3/00; B60L 3/04
USPC ............................................. 200/61.08, 61.8
See application file for complete search history.

(56) References Cited

U.S. PATENT DOCUMENTS 4,638,275 A 1/1987 Belbel et al.
6,007,377 A 12/1999 Cook

FOREIGN PATENT DOCUMENTS

EP 3618090 A2 3/2020

OTHER PUBLICATIONS

International Search Report and Written Opinion issued in International Application No. PCT/FR2021/051382 on Nov. 25, 2021 (17 pages).

*Primary Examiner* — Anthony R Jimenez
(74) *Attorney, Agent, or Firm* — Bookoff McAndrews PLLC

(57) ABSTRACT

The disclosure includes a sealed device having a seal around an internal chamber, the seal having at least two closed-loop portions through which a through element extends.

20 Claims, 4 Drawing Sheets

[Fig. 1]
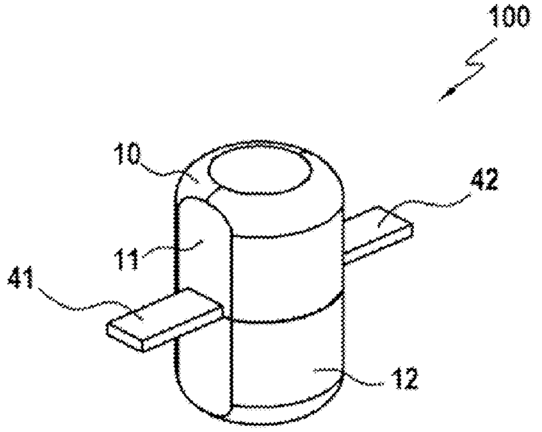
[Fig. 2]
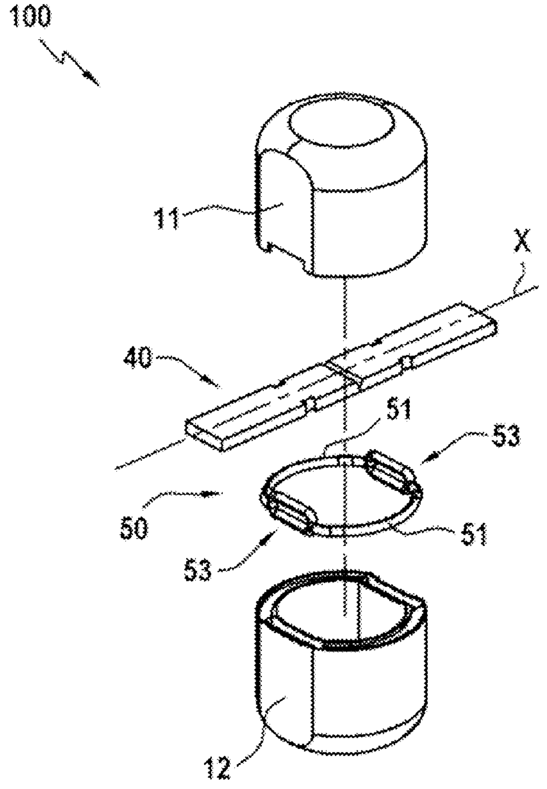

[Fig. 3]
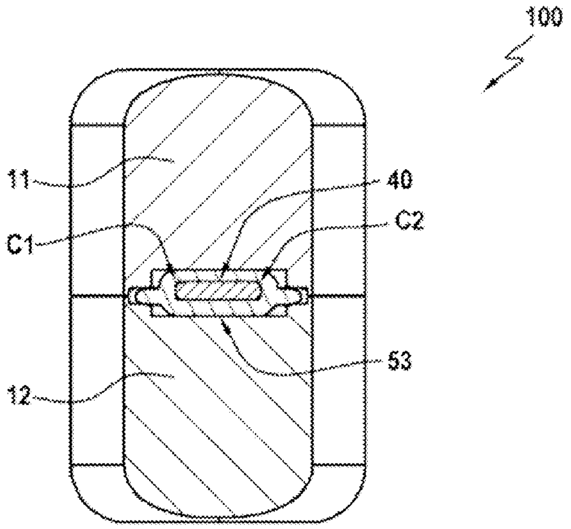
[Fig. 4]
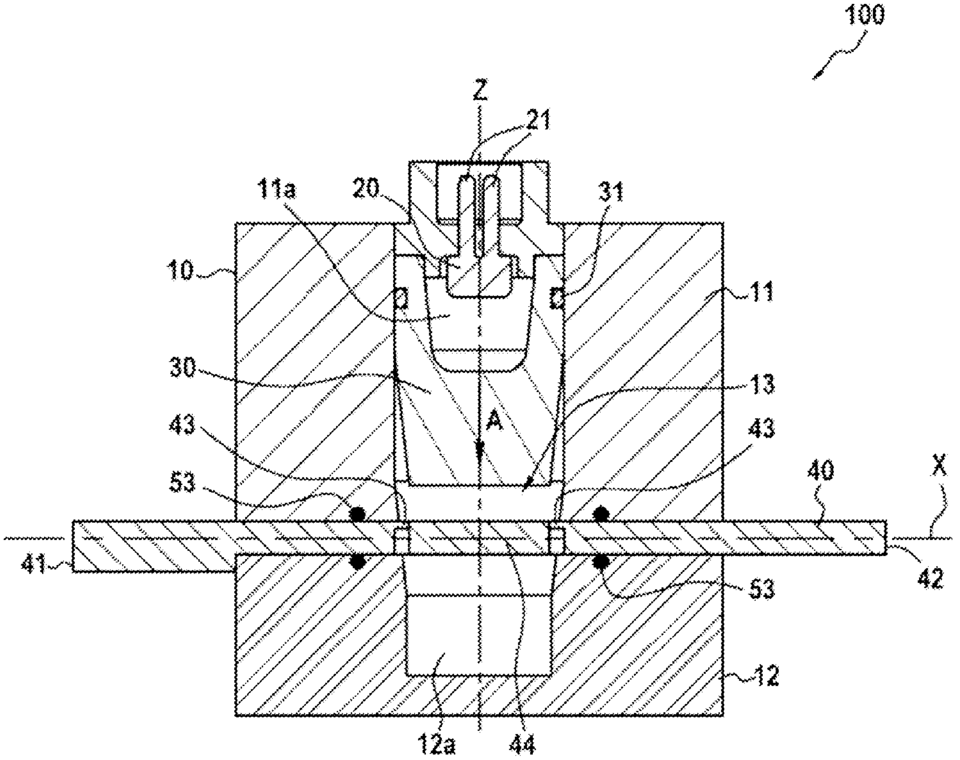

[Fig. 5]
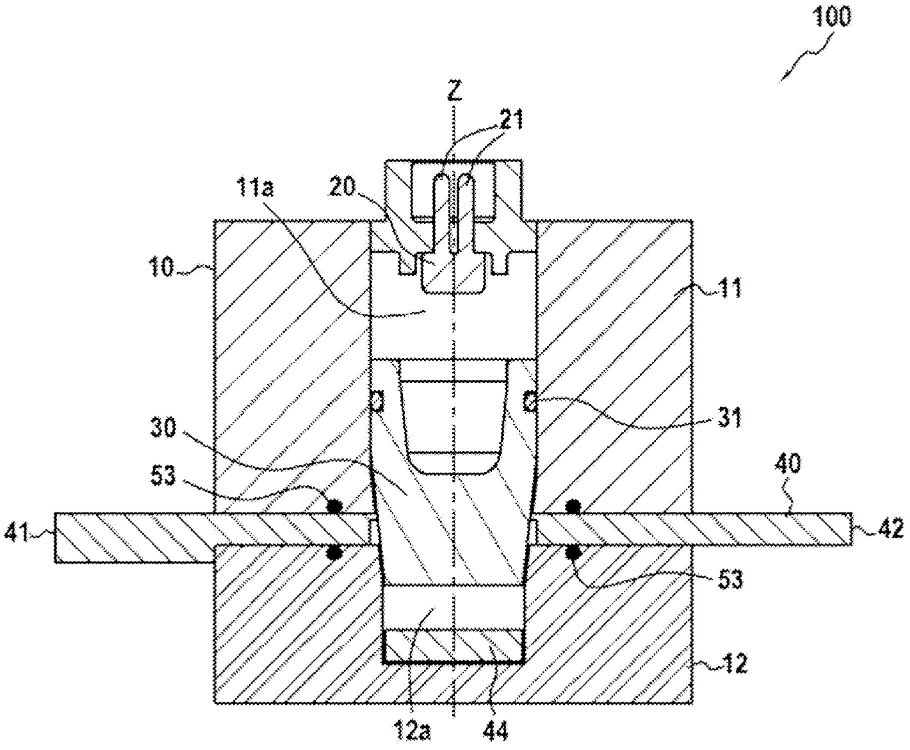
[Fig. 6]
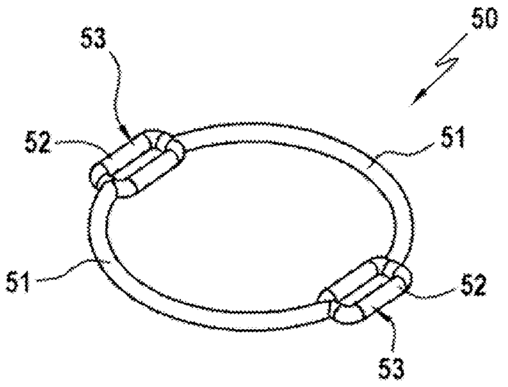

[Fig. 7]
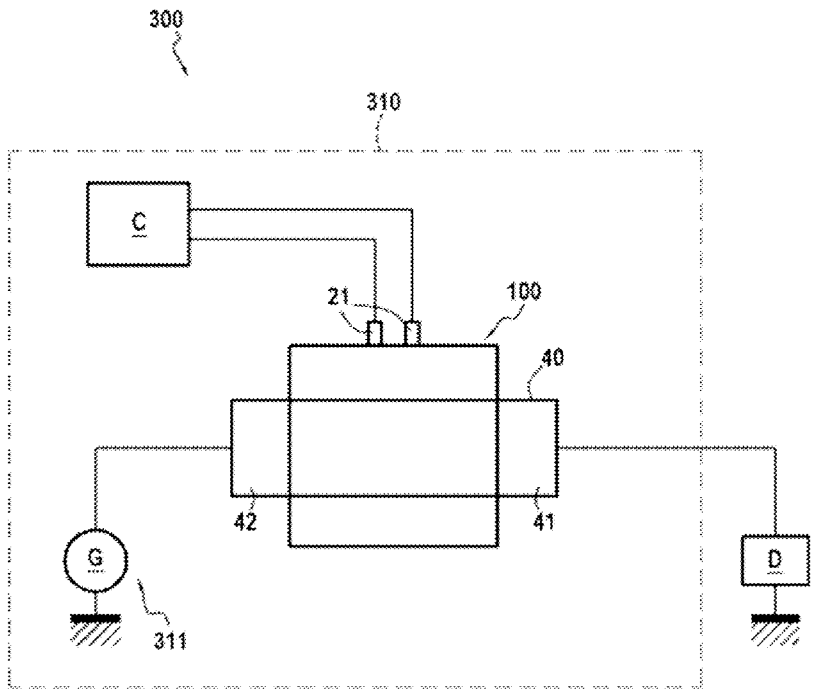
[Fig. 8]
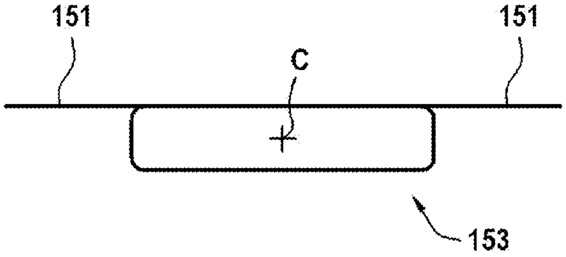

DEVICE WITH SEALED INNER CHAMBER

CROSS-REFERENCE TO RELATED APPLICATIONS

This patent application is a U.S. National Stage entry of International Application No. PCT/FR2021/051382, filed on Jul. 23, 2021, now published as WO 2022/023655 A1, which claims priority to French Application No. FR 2007969, filed on Jul. 28, 2020.

TECHNICAL FIELD

The present invention relates to a device with a sealed internal chamber of simple design. A non-limiting application of the invention relates to the field of electrical cut-off devices in which a plasma is generated following the appearance of an electric arc when opening the circuit.

PRIOR ART

Pyrotechnic cut-off devices are known comprising a body in which there is a pyrotechnic initiator configured, when it is triggered, to set in motion a piston provided with a relief in the direction of a conductive bar to be severed. The breaking of the conductive bar through which an electric current passes can cause the generation of a plasma in the internal chamber of the device. It is desired to minimize the risk of exhaust of the plasma outside the cut-off device. It is desirable to have a solution for ensuring in a simple manner a good sealing of an internal chamber of a device.

DISCLOSURE OF THE INVENTION

The invention proposes a device comprising:

- an assembly of a first part and of a second part defining a body of the device and delimiting an internal chamber,
  - a through element extending through the internal chamber between the first part and the second part, and
  - a seal of the internal chamber surrounding the latter, the seal comprising at least two closed-loop portions which surround the through element and ensure a sealing along the latter, and at least two connection portions connecting the closed-loop portions and present between the first part and the second part and ensuring a sealing therebetween.

The seal implemented allows ensuring in a simple manner, using a single piece, a continuous sealing of the internal chamber over its entire circumference and, particularly, at the level of the through element.

In one exemplary embodiment, the closed-loop portions are diametrically opposite.

In one exemplary embodiment, the closed-loop portions have a generally rectangular shape, and the through element has a generally rectangular section at least at the level of the closed-loop portions.

In one exemplary embodiment, the section of the through element has rounded corners.

In one exemplary embodiment, the seal is made of a flexible material and the closed-loop portions are oriented transversely to a plane containing the connection portions by pivoting therearound.

In one exemplary embodiment, the device is an electrical cut-off device, the through element being a conductive element, the device comprising a movable piston in the internal chamber able to break the through element following its setting in motion.

In this application, the seal allows preventing any risk of exhaust of the plasma generated in the internal chamber during the breaking of the through element by impact with the piston during the cut-off.

Particularly, the device can be a pyrotechnic cut-off device which comprises a pyrotechnic initiator, the piston being able to move following the actuation of the pyrotechnic initiator.

In this application, the body can be provided with a gas discharge orifice in communication with the internal chamber and able to discharge its contents, and with a gas introduction orifice in communication with the internal chamber and able to allow the introduction of a gas into the internal chamber, the gas introduction orifice and the gas discharge orifice being identical or distinct.

In this application, the internal chamber can be filled with a dielectric gas whose breakdown voltage is greater than the breakdown voltage of air at a reference pressure taken at 1 bar.

Thus, the pyrotechnic cut-off device has better electric arc cut-off performance than a device filled with air, without increasing the mass or the size of the device.

In this application, the composition of the dielectric gas can at least comprise 2,3,3,3-tetrafluoro-2-(trifluoromethyl) propanenitrile$(CF_3)_2CFCN$.

In this application, the dielectric gas can further comprise at least one gas among dry air, nitrogen and carbon dioxide.

In this application, the molar content of 2,3,3,3-tetrafluoro-2-(trifluoromethyl)propanenitrile $(CF_3)_2CFCN$ in the dielectric gas can be comprised between 10% and 60%.

The gas discharge orifice is in particular able to discharge the air contained in the internal chamber. The gas introduction orifice is in particular able to introduce the dielectric gas into the internal chamber.

In this application, the dielectric gas is able to pressurize the internal chamber to a pressure of at least 1 bar at a temperature of −40° C.

The invention also relates to a secure electrical installation comprising a cut-off device as described above and an electrical circuit connected to the through element.

The invention also relates to a vehicle comprising an electrical installation as described above.

It will be noted that the invention is not limited to an application to an electrical cut-off device. The through element can be alternatively an element carrying one or several sensors that allow measuring a physical or chemical quantity of a gas flowing through the internal chamber for which it is desired to prevent any risk of exhaust outside the device. The sensor(s) can be for example pressure and/or temperature sensors.

BRIEF DESCRIPTION OF THE DRAWINGS

FIG. 1 is a schematic representation of an example of a device according to the invention.

FIG. 2 is an exploded view of the device of FIG. 1.

FIG. 3 is a view of a detail of the device of FIG. 1.

FIG. 4 corresponds to a sectional view of the device of FIG. 1 in a first configuration authorizing the passage of the current.

FIG. 5 corresponds to a sectional view of the device of FIG. 1 in a second current cut-off configuration.

FIG. 6 is a schematic representation of an example of a seal before insertion of the through element through the closed-loop portions.

FIG. 7 is a schematic representation of a secure electrical installation comprising the device of FIG. 1.

FIG. 8 is a detail of a closed-loop portion variant that can be used in the context of the invention.

DESCRIPTION OF THE EMBODIMENTS

The following description is made in the context of an example of a device 100 according to the invention constituting an electrical cut-off device. As indicated above, the invention is not limited to this application.

FIGS. 1, 2, 4 and 5 illustrate a cut-off device 100 according to one embodiment of the invention which comprises a body 10 inside which a pyrotechnic initiator 20, a piston 30 and a through element 40 are installed. The body 10 has a shape extending along a main axis Z. The body 10 can have a generally cylindrical shape, as in the example illustrated. The body 10 is formed by the assembly of a first part 11 with a second part 12. The first 11 and second 12 parts can be superimposed. The first 11 and second 12 parts can form an upper part 11 and a lower part 12 of the body 10. The through element 40 is here an electrically conductive element, for example in the form of a bar or a conductive tab. It extends through the device 100 and is located between the first part 11 and the second part 12. The through element 40 passes through the body 10 and is present both inside the body 10 and outside. The through element 40 is present at the level of an assembly area between the first 11 and second 12 parts. The through element 40 has two terminals 41 and 42 intended to be connected to an electrical circuit (not represented). The terminals 41 and 42 form the terminals of the device 100 and here correspond to the two ends of the through element 40. The piston 30 is mounted so as to be movable between a first current passage position (high position in the example illustrated, see FIG. 4) and a second current cut-off position (low position in the example illustrated, see FIG. 5). The first part 11 defines a storage cavity 11*a* in which the piston 30 is located when it is in its first position. The second part 12 defines a receiving cavity 12*a* which communicates with the storage cavity 11*a*. The receiving cavity 12*a* can be aligned with the storage cavity 11*a* along the main axis Z. The receiving cavity 12*a* is intended to receive the piston 30 when it is in its second position, corresponding to the configuration of the FIG. 5. The junction of the storage cavity 11*a* and of the receiving cavity 12*a* forms an internal chamber 13 in which the piston 30 is intended to move. The piston 30 can extend along the axis Z. In the example illustrated, the piston 30 can have a shape of revolution about the axis Z. The axis Z can correspond to the axis of displacement of the piston 30. The piston 30 comprises a circumferential groove in which a seal 31, for example an O-ring, is housed. The piston 30 can move along a direction of displacement A along the axis Z inside the body 10 between the first and the second position. As long as the pyrotechnic initiator 20 has not been triggered, the piston 30 is in its first position. The through element 40 passes through the internal chamber 13. In the example illustrated, the through element 40 extends along a diameter of the internal chamber 40.

Following the actuation of the pyrotechnic initiator 20, the piston 30 is moved from its first position to its second position. The function of the piston 30 is to break the through element 40 during its passage from its first position to its second position, thus cutting off the flow of the electric current through the through element 40. The pyrotechnic initiator 20 comprises a pyrotechnic charge connected to connectors 21. The pyrotechnic charge, when it is initiated for example using a current passing through the connectors 21, is able to generate a pressurization gas by its combustion. The illustrated variant shows a pyrotechnically actuated cut-off device 100 but there is no departure from the scope of the invention if the piston is moved otherwise, for example following the release of a return element or of a gas stored under pressure.

In order to facilitate the breaking of the through element 40 by the piston 30, the through element 40 can optionally comprise one or several areas of weakness 43 intended to form a breaking point of the through element 40. the illustrated through element 40 comprises two areas of weakness 43, making it possible to ensure a fracture in the through element 40 at two breaking points and to detach a broken portion 44 from the rest of the through element 40. In one variant not illustrated, the through element has only a single area of weakness and is broken at a single breaking point, the broken portion being bent by the piston in the receiving cavity when the piston is in the second position.

The breaking of the through element 40 by impact with the piston 30 can lead to the generation of a gas plasma in the internal chamber 13 for which it is desired to prevent leakage through the body 10. To do so, the device is provided with a seal 50.

The seal 50 surrounds the internal chamber 13 around its entire circumference, thus surrounding the area in which the plasma is generated. The seal 50 is located between the first part 11 and the second part 12, in the assembly area therebetween. The first part 11 and the second part 12 can each comprise a slot which is intended to receive the seal 50. The slots have a shape complementary to the seal 50. The seal 50 defines a closed here generally circular shape, it being understood that other shapes are possible depending on the shape of the body 10, such as a polygonal or elliptical shape. The internal chamber 13 is located inside the closed shape defined by the seal 50. The through element 40, and particularly its area(s) of weakness 43, is located inside the closed shape defined by the seal 50. The seal 50 comprises in the illustrated example two closed-loop portions 53 and two connection portions 51 which connect the closed-loop portions 53. Each of the connection portions 51 is located between the closed-loop portions 53. The connection portions 51 can be formed by one strand and the closed-loop portions 53 by two strands. The ends of the connection portions 51 are connected to the closed loops 53. As illustrated, the strand forming the connection portions 51 can be split at the ends of the connection portions 51 to form the closed-loop portions 53. The connection portions 51 can be single-stranded and the closed-loop portions 53 double-stranded. The strands forming the connection portions 51 and/or the closed-loop portions 53 can have a circular, elliptical or polygonal, for example square or non-square rectangular, cross section. The strands forming the connection portions 51 and the closed-loop portions 53 can be of identical shape and/or of larger identical transverse dimension, for example of identical diameter. Such a feature contributes to further improving the sealing. The through element 40 is introduced inside the closed-loop portions 53 and extends between the connection portions 51. The through element 40 is housed inside the closed-loop portions 53. The through element 40 and the connection portions 51 can be located in the same plane. The closed-loop portions 53 can be transverse to the plane containing the connection portions 51, for example perpendicular to this plane. The closed-loop portions 53 enclose the through element 40. The closed-loop portions 53 can be transverse, for example perpendicular, to the longitudinal axis X of the through element 40. The closed-loop portions 53 locally surround the through element 40 over its entire circumference about its longitudinal axis X. The closed-loop portions 53 are in contact with the through element 40. The shape of the closed-loop portions 53 can be identical to the shape of the section of the through element 40 at the level thereof. The section of the through element is, unless otherwise stated, taken transversely, for example perpendicularly, to its longitudinal axis X. The closed-loop portions 53 are located between the first part 11 and the second part 12. The closed-loop portions 53 ensure the sealing at le level of the portion of the through element 40 located on the assembly area of the first 11 and second 12 parts. The closed-loop portions 53 ensure the sealing along the longitudinal axis X of the through element 40. In the example illustrated, the closed-loop portions 53 have a generally rectangular shape with rounded inner corners C1. The through element 40 has no sharp ridge at the level of the areas on which it is surrounded by the closed-loop portions 53. The ridges, or corners C2, of the through element 40 can be rounded at the level of these areas, for example by machining. The presence of rounded corners C1 and C2 allows improving the sealing. It will be noted that other shapes are possible for the closed-loop portions depending on the shape of the section of the through element such as a generally square, circular or elliptical shape. The closed-loop portions 53 can define openings of the same surface. This allows a simpler manufacture of the seal 50. Similarly, the section of the through element 40 at the level of each of the closed-loop portions 53 can be identical. The connection portions 51 ensure, for their part, the sealing on the assembly area between the first 11 and second 12 parts in a direction transverse to the longitudinal axis X of the through element 40. The seal 50 constitutes one and the same element making it possible to ensure continuity of the sealing around the internal chamber 13.

An example has been described comprising exactly two closed-loop portions 53 and two connection portions 51. There is no departure from the scope of the invention if more than two closed-loop portions are used, it could be for example possible to have four or six closed-loop portions for a device respectively with two or three through elements. In the example illustrated, the closed-loop portions 53 are diametrically opposite, which allows using exactly the same device and particularly through element 40 geometry as in the absence of a seal 50, thus making it simpler to obtain the device 100 but there is no departure from the scope of the invention when this is not the case.

FIG. 6 illustrates the seal 50 at rest, that is to say before placing the through element 40 through the closed-loop portions 53. In the example illustrated, the seal 50 has a planar shape when it at rest. Thus, the connection portions 51 and the closed-loop portions 53 are located in the same plane. The strands 52 forming the closed-loop portions 53 are located in the same plane as the strands forming the connection portions 51 when the seal 50 is at rest. During the assembly of the device 100, the closed-loop portions 53 are straightened in order to install the through element 40 in the loops 53 thanks to the flexibility of the seal 50. The seal is formed of a flexible material allowing this straightening of the closed-loop portions 53. The seal can in particular be made of one of the following materials: silicone, nitrile rubber (NBR), hydrogenated nitrile rubber (HNBR), ethylene-propylene-diene monomer (EPDM), fluoroelastomer (FKM). The flexible seal variant is particularly easy to manufacture. However, there is no departure from the scope of the invention if the seal is directly obtained with closed-loop portions transverse to the connection portions.

According to one particular embodiment of the invention, the air located inside the chamber 13 after the assembly of the cut-off device 100 can be discharged through a gas discharge orifice. A dielectric gas can then be introduced into the internal chamber 13 of the cut-off device 100 through a gas introduction orifice. The gas discharge and introduction orifices can be identical or distinct.

The dielectric gas has a breakdown voltage greater than that of air at a reference pressure taken as 1 bar. Thus, the breaking device 100 has a greater cut-off capacity than a device whose internal chamber is filled with air, and the electric arc generated inside the chamber 13 is extinguished more quickly and over a shorter distance. Consequently, a better cut-off capacity is obtained without modifying the size or the mass of the cut-off device.

The dielectric gas is introduced into the cut-off device 100 at room temperature, for example at a temperature of 20° C. The dielectric gas can be able to pressurize the internal chamber 13 at a pressure of at least 1 bar at a temperature of −40° C. The pressure of the dielectric gas in the internal chamber 13 can be greater than 1 bar, even in the case of cold temperatures comprised between 0° C. and −40° C. The use of the seal 50 described above is particularly advantageous in order to maintain the dielectric gas in the internal chamber 13 and prevent it from leaking outside the body 10.

The dielectric gas can be a mixture comprising gas $(CF_3)_2CFCN$(2,3,3,3-tetrafluoro-2-(trifluoromethyl)propanenitrile, marketed under the name 3M™Novec™ 4710, and at least one other gas among dry air, nitrogen ($N_2$) and carbon dioxide ($CO_2$). The molar content of Novec™ 4710 in the dielectric gas can be comprised between 10% and 60%. Preferably, the molar content of Novec™ 4710 in the dielectric gas is comprised between 15% and 25%.

Furthermore, a humidity-absorbing product can be placed inside the chamber 13 so as to prevent the hydrolysis of the dielectric gas, for example in the form of a metal sulphate or of a molecular sieve whose pore size is less than or equal to 5 Å.

An example of a cut-off device 100 for which a sealing against gas plasma is obtained by implementation of the seal 50 has just described. The cut-off device 100 considered is intended to be incorporated in a secure electrical installation 300, one example of which will now be described in connection with FIG. 7.

The secure electrical installation 300 comprises a secure power supply system 310 comprising the cut-off device 100 (represented very schematically) and a power supply circuit 311. The power supply circuit 311 here comprises an electric generator G connected to the second terminal 42 of the through element 40 of the cut-off device 100. The electric generator G can be for example a battery or an alternator. The secure power supply system 310 further comprises a monitoring element C configured to actuate the pyrotechnic initiator 20 when an anomaly is detected. The monitoring element C is connected to the pyrotechnic initiator 20 through connectors 21. The anomaly in response to which the monitoring element C can trigger the pyrotechnic initiator 20 can be an electrical anomaly, such as an exceeded current threshold in the circuit, or a non-electrical anomaly such as the detection of a shock, for example a sudden deceleration of the monitoring element, of a change in temperature, pressure, etc. In case of detection of an anomaly, the monitoring element C is able to send an electric current to the pyrotechnic initiator 20 for its triggering in order to cut off the current, as described above.

The secure electrical installation 300 finally comprises an electrical device D connected here to the first terminal 41 of the through element 40 of the cut-off device 100 to be powered by the secure power supply system 310. By way of example, an automobile vehicle can comprise a secure electrical installation 300.

In the embodiment illustrated in FIG. 6, the strands of the closed-loop portions 53 have an identical length. Thus, the center of the loops 53 is located in the extension of the strands of the connection portions 51. As illustrated in FIG. 8, the strands of the closed-loop portions 153 can have a different length, one strand having a length greater than the other. In the variant illustrated in FIG. 8, the center C of the closed-loop portions 153 is offset from the extension of the strands of the connection portions 151.

The invention claimed is:

1. A device comprising:

an assembly of a first part and a second part defining a body of the device and delimiting an internal chamber, a through element extending through the internal chamber between the first part and the second part, and a seal of the internal chamber surrounding the internal chamber, configured to produce a sealing against a plasma or a gas present in the internal chamber, the seal comprising at least two closed-loop portions which surround the through element and ensure a sealing along the through element, and at least two connection portions connecting the closed-loop portions and present between the first part and the second part and ensuring a sealing therebetween, wherein the at least two closed-loop portions and the at least two connection portions surround an entire circumference of the internal chamber.

2. The device according to claim 1, wherein a section of the through element has rounded corners.

3. The device according to claim 1, wherein the seal is made of a flexible material, and wherein the closed-loop portions are oriented transversely to a plane containing the connection portions by pivoting therearound.

4. The device according to claim 1, wherein the closed-loop portions are diametrically opposite.

5. The device according to claim 4, wherein the closed-loop portions have a rectangular shape, and the through element has a rectangular section at least at a level of the closed-loop portions.

6. The device according to claim 4, wherein a section of the through element has rounded corners.

7. The device according to claim 4, wherein the seal is made of a flexible material, and wherein the closed-loop portions are oriented transversely to a plane containing the connection portions by pivoting therearound.

8. The device according to claim 1, wherein the closed-loop portions have a rectangular shape, and the through element has a rectangular section at least at a level of the closed-loop portions.

9. The device according to claim 8, wherein the section of the through element has rounded corners.

10. The device according to claim 8, wherein the seal is made of a flexible material, and wherein the closed-loop portions are oriented transversely to a plane containing the connection portions by pivoting therearound.

11. The device according to claim 1, wherein the device is an electrical cut-off device, the through element being a conductive element, the device comprising a movable piston in the internal chamber able to break the through element following its setting in motion.

12. The device according to claim 11, wherein the device is a pyrotechnic cut-off device which comprises a pyrotechnic initiator, the piston being able to move following an actuation of the pyrotechnic initiator.

13. The device according to claim 11, wherein the internal chamber is filled with a dielectric gas whose breakdown voltage is greater than the breakdown voltage of air at a reference pressure taken at 1 bar.

14. The device according to claim 13, wherein the dielectric gas pressurizes the internal chamber to a pressure of at least 1 bar at a temperature of −40° C.

15. The device according to claim 13, wherein the dielectric gas comprises at least 2,3,3,3-tetrafluoro-2-(trifluoromethyl)propanenitrile(CF3)2CFCN.

16. The device according to claim 15, wherein the dielectric gas further comprises at least one gas among air, nitrogen and carbon dioxide.

17. The device according to claim 15, wherein a molar content of 2,3,3,3-tetrafluoro-2-(trifluoromethyl)propanenitrile(CF3)2CFCN in the dielectric gas is comprised between 10% and 60%.

18. An electrical installation comprising a cut-off device according to claim 11 and an electrical circuit connected to the through element.

19. A vehicle comprising an electrical installation according to claim 18.

20. A device comprising:

an assembly of a first part and a second part defining a body of the device and delimiting an internal chamber, a through element extending through the internal chamber between the first part and the second part, and a seal of the internal chamber surrounding the internal chamber, configured to seal against a plasma or a gas present in the internal chamber, the seal comprising at least two closed-loop portions which surround the through element and ensure sealing along the through element, and at least two connection portions connecting the closed-loop portions and present between the first part and the second part and ensuring sealing therebetween, wherein the first part and the second part each comprise a slot that receives the seal, a depth of the portions of the slot which receive the closed-loop portions of the seal is greater than a depth of the portions of the slot which receives the connection portions of the seal.

* * * * *